May 29, 1962     E. TAUDIERE     3,036,706

GRAIN CLEANING AND GRADING MACHINE

Filed March 15, 1960     7 Sheets-Sheet 1

May 29, 1962 E. TAUDIERE 3,036,706
GRAIN CLEANING AND GRADING MACHINE
Filed March 15, 1960 7 Sheets-Sheet 4

May 29, 1962 E. TAUDIERE 3,036,706
GRAIN CLEANING AND GRADING MACHINE
Filed March 15, 1960 7 Sheets-Sheet 5

May 29, 1962 E. TAUDIERE 3,036,706
GRAIN CLEANING AND GRADING MACHINE
Filed March 15, 1960 7 Sheets-Sheet 6

May 29, 1962 E. TAUDIERE 3,036,706
GRAIN CLEANING AND GRADING MACHINE
Filed March 15, 1960 7 Sheets-Sheet 7

United States Patent Office 3,036,706
Patented May 29, 1962

3,036,706
GRAIN CLEANING AND GRADING MACHINE
Emile Taudiere, Paris, France, assignor to Societe Emile Marat, Societe a Responsabilite Limitee, Niort, France
Filed Mar. 15, 1960, Ser. No. 15,205
Claims priority, application France Mar. 16, 1959
10 Claims. (Cl. 209—35)

The present invention relates to grain cleaning and grading machines and it is the specific object of this invention to provide a machine adapted to clean and grade grains delivered for example from a harvester-thresher machine by means of a suction force adjustable at will, in combination with a rotary screen.

The grain cleaning and grading machine of this invention is characterized by the provision of a distributor hopper into which the grain to be treated is discharged and thus caused to fall into a rotary screening drum after having travelled past an aperture from which it receives a transverse, suitably directed stream of cleaning air drawn through this aperture by a suction-fan.

The suction force is adjusted at will without altering the air output of the fan by closing more or less adjustable ports opening into the expansion chest, the fan drawing additional air through these ports and subsequently forcing this additional air through an exhaust duct together with the air loaded with the lighter impurities.

The direction of the suction stream, with due consideration for the type and thickness of the layer of products to be cleaned by density which travel across the suction passage slightly below the feed hopper outlet, is adjusted by means of pivoting baffle means mounted beneath this passage.

Then the products to be treated move downwards into a rotary screen in which they are cleaned and graded.

*According to Their Size and Density:*

*Size grading.* — Smaller impurities are eliminated through perforations smaller than the good products; impurities larger than these products are then repelled by the perforations through which the good products are allowed to flow; on the other hand, these perforations may have different sizes so that the good products may be graded automatically in different categories.

*Density grading.*—Heavier impurities having a greater volume than, and the same density as that of, the good products will constantly remain on the surface of the layer of products to be treated, due to the stirring action of the spreader and shovelling blade device utilized in this machine; these heavier impurities are eliminated at the end of the layer, like the larger impurities, when all the good products have passed through the perforated grid or screen by which they were supported.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings in which.

Figure 1:
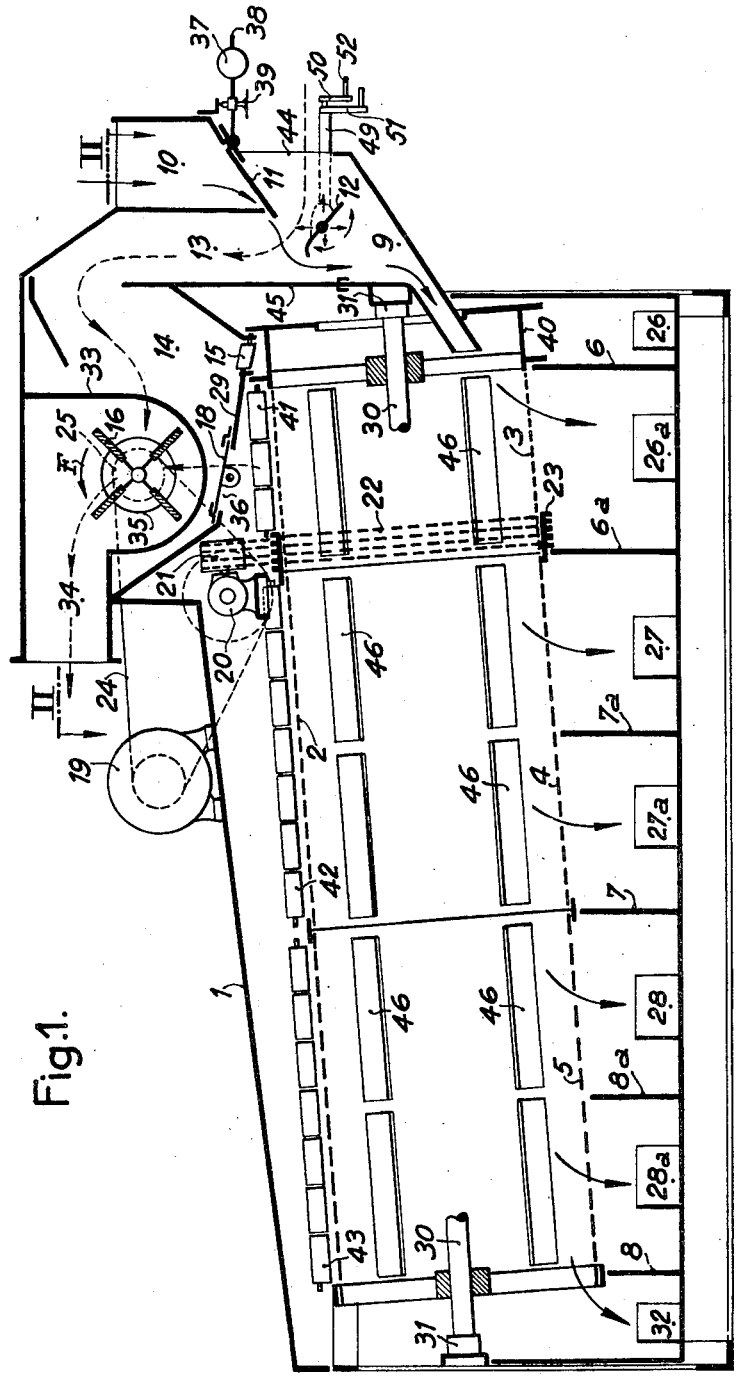
FIGURE 1 is a vertical section of the machine which is taken along the axis of the screening drum.

The machine comprises a closed chamber 1 in which a screening cylinder or drum 2 having its axis slightly inclined to the horizontal is rotatably mounted.

The central shaft 30 of the screen is supported at its lower and upper ends by a pair of bearings 31 also mounted in the chamber 1.

The outer surface of the screening cylinder 2 consists of a plurality of detachable perforated sections 3, 4, 5. The perforations of each section located after the first section 3 have a greater area than those of the preceding section lying at a higher level.

The holes formed in the detachable sections 3, 4, 5 are cleared continuously and regularly by multi-roller elements 41, 42, 43 lined with or made from relatively hard material, although brush-type rollers may be used according to the size of the perforations, these rollers resting upon the detachable sections 3, 4, 5 at the upper portion of the screening cylinder 2 and being driven therefrom; thus, without inducing any detrimental frictional contact and by gravity alone, these rollers 41, 42, 43 force back into the screening cylinder those products and particles which, on account of their size approaching that of the relevant perforations, remain wedged therein and clog them. The action of these rollers or brushes 41, 42, 43 is inasmuch efficient in the machine forming the subject-matter of this invention as along this generatrix of the screening cylinder 2 no pressure is exerted by the product itself on the particles wedged in the holes.

The lower portion of chamber 1 is divided by fixed and movable partitions 6, 6a, 7, 8, and 7a, 8a respectively into compartments underlying the sections 3, 4, 5 respectively.

In order more completely to grade the products to be treated, each section 3, 4, 5 may comprise holes of different sizes. Detachable partitions may be disposed between different groups of perforations in order properly to separate products having different characteristics. Each compartment may be discharged or drained through lower apertures shown diagrammatically at 26, 26a, 27, 27a, 28, 28a and 32.

The head or upper end flange of the screening cylinder or drum 2 is formed with a central aperture engaged by a chute 9 for pouring the product into this screening drum.

This chute 9 extends upwardly in a funnel 13 fed by a hopper 10 having its bottom inclined toward the machine and partially closed by a shutter 11. This shutter 11 is adjustable to different angular positions according to the desired output by means of a counterweight 37 sliding on rods 38 rigid with the shutter 11; the maximum opening position is safely obtained by the provision of adjustable stops 39.

Under the hopper 10 and above the chute 9 the forward wall of the funnel 13 is formed with an aperture 44 through which air is drawn by the suction-fan 16 for removing the products to be treated, the light products and middle-weight products.

The air stream thus produced is directed beneath the flow of grains flowing from the hopper 10 on the shutter 11 to the chute 9.

Figure 3:
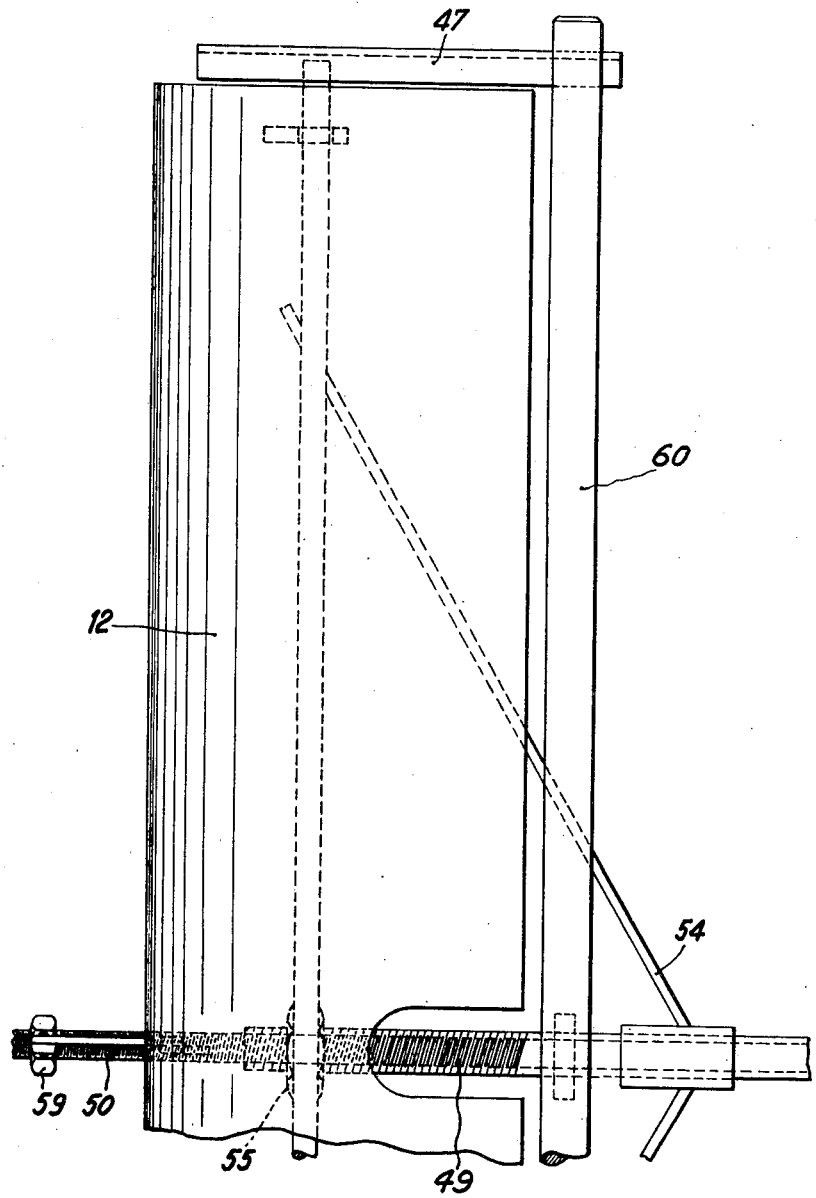
FIGURES 3 and 4 illustrate on a larger scale the baffle means with its control system in plan view (with parts removed) and in longitudinal section, respectively.
Figure 4:
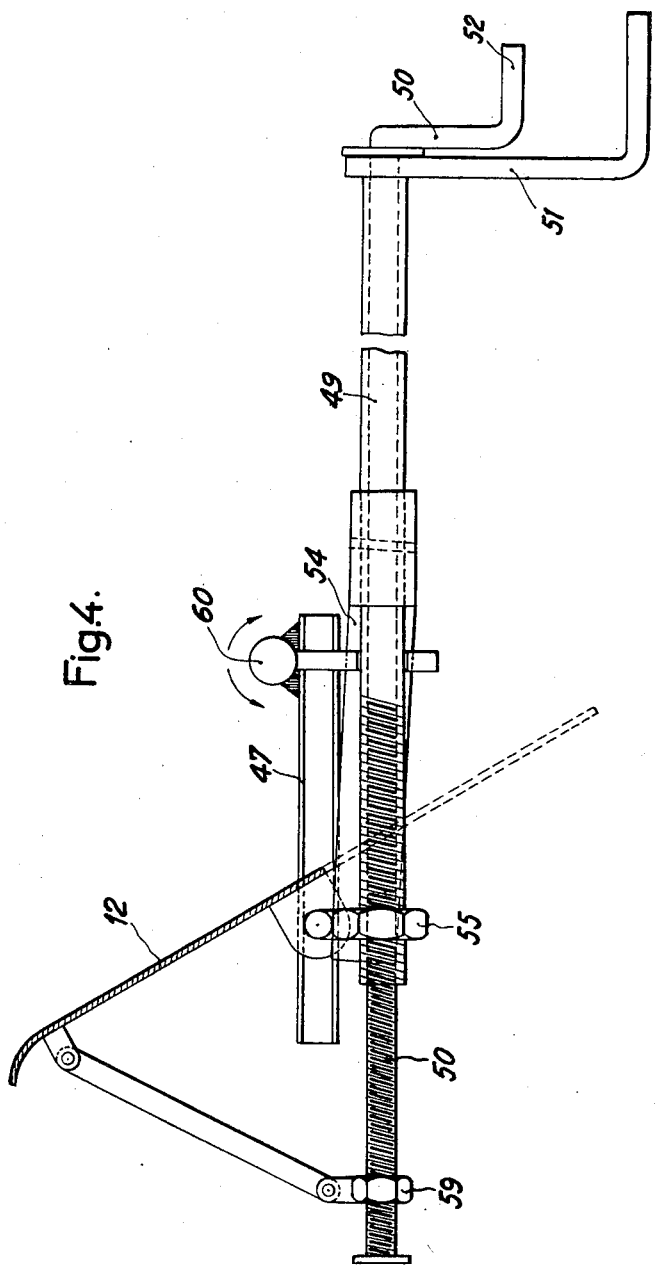

According to the thickness of the flow of grains to be treated, the quantity of light and middle-weight impurities to be removed, and the nature of these products, the incoming air stream is set in different directions with respect to the flow to be cleaned by adjusting the baffle or deflector plate 12 accordingly. This deflector plate 12 (see FIGS. 3 and 4) has its two end trunnions engaged in a pair of movable slideways 47 adjustable about a fixed shaft 60. Moreover, this deflector plate has its lower portion rigid with a guide bar 54 and a tapped nut 55 engaging a threaded tube 49, the upper portion of the baffle plate 12 being attached to a tapped nut 59 engaging the threaded rod 50. The tube 49 and rod 50 are mounted coaxially to each other and adapted to pivot about the shaft 60. The tube and rod are controlled by means of two crank-handles 51 and 52 respectively. Due to the conjugate action produced by the inclination of slideways 47 and by the rotation of the rod 50 and tube 49 the baffle plate 12 may be inclined and displaced at will up- and downward, forward and backward, with respect to the shutter 11.

Above the aperture between the shutter 11 and swivelling baffle plate 12 the funnel 13 extends upwards at a height calculated to permit the density-cleaning of the products to be treated.

The suction funnel 13 opens into an expansion chamber 14 having its walls secured on the upper front portion of the closed space 1.

Under these conditions, the walls of this expansion chamber 14 support the assembly comprising hopper 10, funnel 13 and chute 9.

In the lowest region of the expansion chamber 14 the inclined bottom 29 is formed with an aperture having mounted therein parallel blades 15 independent of one another and movable about a pivot pin at their upper end. These blades are normally kept closed, during the operation of the machine, by the vacuum formed by the suction-fan 16 within the expansion chamber 14.

These blades 15 may be caused to open more or less under the influence of the weight of the middle-weight products deposited thereon internally of the expansion chamber 14 after having been drawn up the funnel 13. When these blades 15 are thus opened the middle-weight products flow into the space 1 and the thus unloaded blades 15 are allowed to close again.

These middle-weight products fall upon the head 40 of the screening drum 2 which consists of a solid cylindrical portion disposed between a pair of outer flanges having a certain width, these flanges being rigid with the outer surface of the screening cylinder 2; this head 40, as it revolves, directs the middle-weight products to the lower discharge aperture 26.

The housing 33 of the suction-fan 16 is mounted within the expansion chamber 14. This housing has its outlet aperture directed to the rear in the form of a passage 34 and communicates with the inner space of chamber 14 and therefore with the funnel 13 through circular apertures 35 formed in the lateral walls coaxially to the fan shaft.

Figure 2:
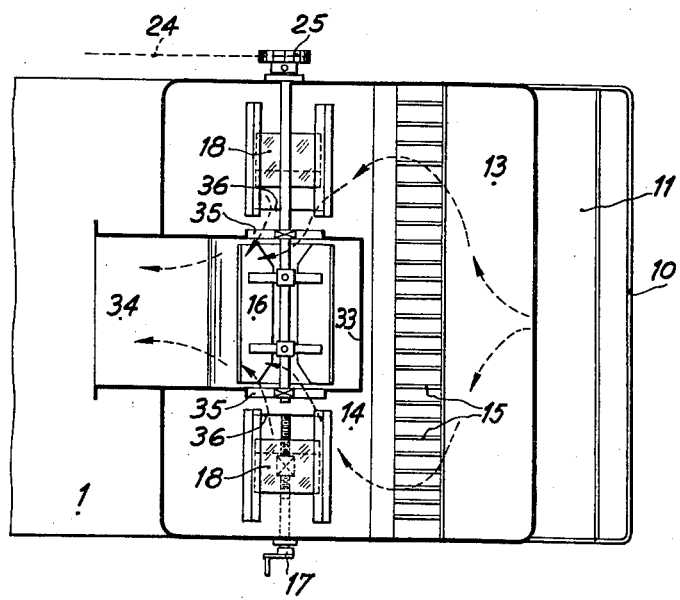
FIGURE 2 is a section taken upon the line II—II of FIG. 1 to show notably the suction fan with its suction passages and its aperture for expelling the air loaded with light impurities.

The expansion chamber 14 communicates on the other hand with the inner space 1 through a pair of apertures 36 formed in the inclined bottom 29 of this chamber on either side of the housing 33 of fan 16. A member 17 (FIG. 2) is provided for controlling the movements of a pair of sliding gates 18 adapted to close these two apertures 36. For a same velocity of rotation of the suction-fan the air output and pressure remain constant in the outlet passage 34 but the suction force available in the funnel 13 is inversely proportional to the degree of opening of these apertures 36, and it is possible to vary at will this suction force without altering the cross-sectional areas of the funnel 13, circular apertures 35 and outlet 34 through which the air stream loaded with light impurities is circulated.

The apertures 36 through which the closed space 1 communicates with the fan 16 are adapted to absorb all the dust particles and light skin fragments separated from the products being treated, which are in suspension within the closed space 1.

A single motor 19 mounted externally of the machine on the upper wall of the housing 1 drives simultaneously and directly through a belt 24 and a pulley 25, at a relatively fast velocity of rotation, the suction-fan 16 in the direction of the arrow F, FIG. 1, and, through the medium of a reducing gear 20 for example of the worm-and-wheel type, another pulley 21, belts 22 and grooves 23 formed on the outer surface of the screening cylinder 2, so as to rotate the latter at a relatively slow rate.

The machine according to this invention, due to its mode of operation, is capable of performing simultaneously the cleaning and grading of a product to be treated, whereas these two operations require two separate machines with the hitherto known methods.

Considering now the specific case of the treatment of a batch of grain, the operator starts the motor 19 which rotates the screening cylinder 2 and the suction-fan 16. After having properly adjusted the counterweight of the shutter 11, as consistent with the proper output of grain to be treated, the operator pours the product into the hopper 10. The grains flow in the form of a uniform layer on the shutter 11, through the lower aperture of the hopper 10 and toward the chute 9.

The air entering the aperture 44 between hopper 10 and chute 9 is drawn by the suction-fan 16, through expansion chamber 14, funnel 13 and through the flow of grains to be treated that falls from hopper 10 to chute 9. This air stream is so directed by the adjustable deflector or baffle plate 12 and its speed and force are such that the flow of grains is stirred and dispersed in the funnel 13 so as to remove the light and middle-weight impurities from the product to be treated, these impurities being carried along into the expansion chamber 14 while the density-cleaned grains are allowed to descend down the chute 9 between the upper portion of the deflector or baffle plate 12 and the rear wall 45 of the funnel 13.

The air stream loaded with impurities deposits the middle-weight impurities as it flows through the expansion chamber 14.

In this expansion chamber 14 this air is mixed with additional air drawn by the suction-fan 16 through the apertures 36 from the closed space 1, these apertures being adjusted as already set forth by means of the sliding shutters 18. This mixed air carries along, through the circular apertures 35 formed in the side walls of the housing 33, the light impurities drawn by the fan 16 which expels them to the outside through the rear outlet 34 of the fan housing 33.

The heavier impurities deposited by the air stream in the expansion chamber 14 slide along the inclined bottom 29 down to its lower aperture closed by the parallel blades 15 and connecting the expansion chamber 14 to the closed space 1.

The middle-weight impurities accumulate on the parallel blades 15 and when at any location of this aperture the weight of these impurities which is supported by the parallel blades 15 exceeds the antagonistic suction force of the fan 16, the parallel blades 15 open to free the passage for these impurities but are then re-closed immediately.

The middle-weight impurities fall from the parallel blades 15 onto the head 40 of the screening cylinder 2. They are guided between two circular flanges on a neutral strip, without perforations, of the outer surface of the screening cylinder 2, from which they are directed toward the bottom of the space 1 and discharged through the lower aperture 26.

The grains thus cleared of the light impurities drawn by the air suction and also of the heavier or middle-weight impurities previously mixed with the batch of grains to be treated flow downward along the chute 9 and through the circular aperture formed in the head flange of the screening cylinder 2 into the latter.

The grains, due to the inclination and rotation of the drum 2 advance therein while being regularly stirred by the spreader and shovelling blades mounted in the fashion shown diagrammatically at 46.

During their forward travel the grains move past the perforations of the detachable sections 3, 4, 5 and pass therethrough, according to their size, in the initial, intermediate or last portions of the cylinder; if their size is too large, they are prevented from passing through the larger holes and escape from the lower end of the cylinder.

It is possible, for example, to obtain the grain size groups listed hereafter by using detachable sections having hole sizes consistent with the desired result for a given batch of grains: ahead, that is, at the front or upper end of the screening cylinder 2 and through the detachable section 3, the impurities having a density greater than or equal to that of the good products but smaller in size than these products are allowed to pass. Then the good grains divided into one or more size groups, at will, pass through the next detachable sections 4, 5. At the rear or lower end of the screening cylinder 2 the impurities of same density and size as, but of greater volume than, the good products, escape similarly for the stirring action exerted by the spreader and shovelling blades 46 within this cylinder 2 will constantly keep these impurities in the top layer of the mass of grains to be treated. They flow out from this cylinder when the thicker layer of good grains, of which the surface layer consists of these rising impurities driven within the cylinder 2, has gradually disappeared due to the screening of the good grains through the perforations of the detachable sections by which they were supported.

Each size group of grains thus sieved through the detachable sections 3, 4 and 5, as well as the tail group which was refused by the holes and expelled from the rear end of the apparatus are collected by the bottom portion of the closed space 1, under each detachable element and at the rear end of the cylinder, in a compartment separate from the adjacent compartments by fixed partitions 6, 6a, 7 and 8, and, in case the products are to be graded into several size groups, also by the detachable partitions 7a and 8a.

Each compartment is drained from the bottom of the space 1 by means of adequate apertures 26, 26a, 27, 27a, 28, 28a and 32.

Figure 5:
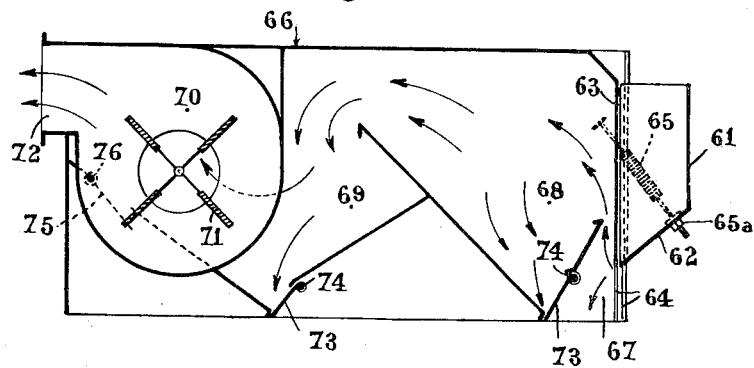
FIGURE 5 is a vertical section showing an alternate embodiment of the system for circulating the air drawn by the suction fan.

In the alternate embodiment shown in FIG. 5, the distributor hopper feeding the rotary screen consists of a housing having three vertical sides and a bottom 62 inclined to the front.

This hopper 61 is not provided with a vertical guide wall, the rear wall 63 of housing 66 being substituted therefor. This hopper 61 is mounted for vertical sliding movement in slideways 64 formed in the rear portion 63 of the housing, this movement being controlled by the resilient force of traction springs 65 having one end secured to the inclined bottom 62 of the hopper and their other end attached to the housing 66. These springs are preferably adjustable and to this end their lower end comprises a threaded rod extending through the bottom of the hopper and receiving an adjustment nut 65a, as shown.

Figure 6:
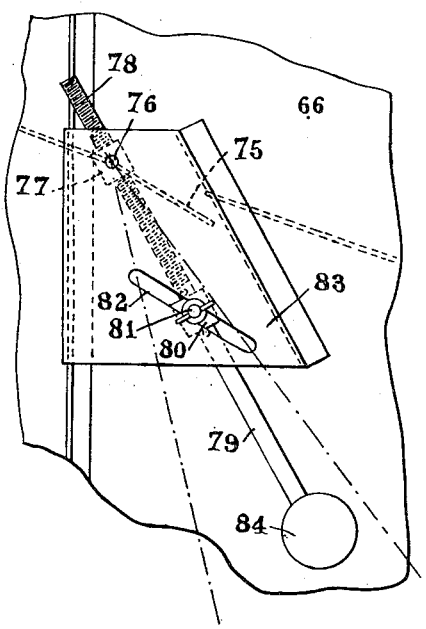
FIGURE 6 shows on a larger scale a mechanism for separately adjusting the vacuum in different compartments of the system.
Figure 7:
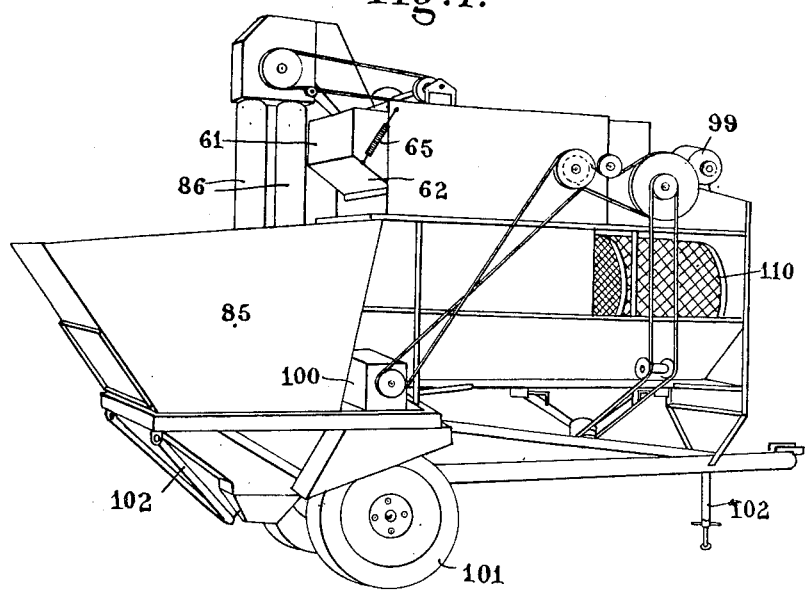
FIGURE 7 is a perspective view showing a modified embodiment of the power take-off and transmission means provided for driving the movable elements.
Figure 8:
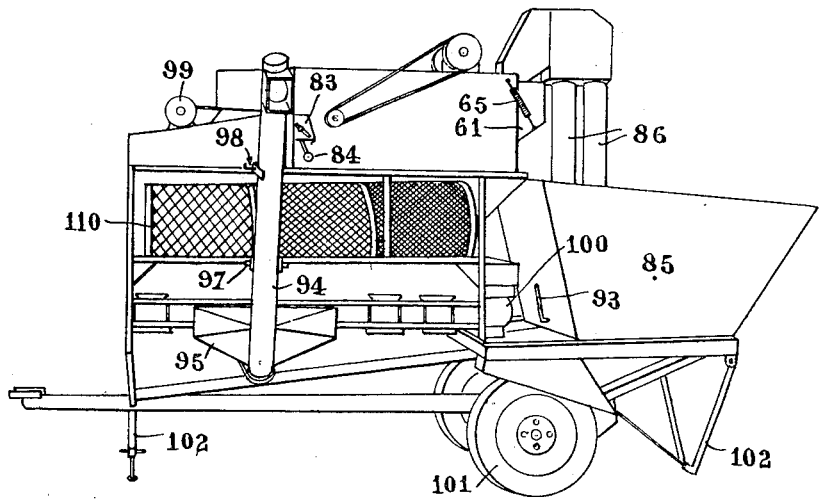
FIGURE 8 is a view similar to FIG. 7 but taken from the opposite side of the machine, which shows an elevator for the graded grain.
Figure 9:
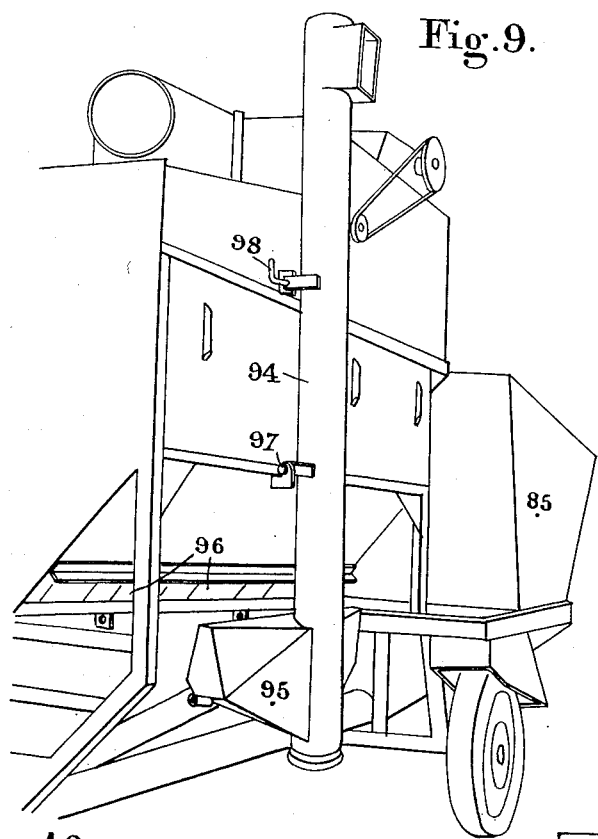
FIGURE 9 is a fragmentary perspective view of the machine which shows the means for retracting and locking the elevator.
Figure 10:
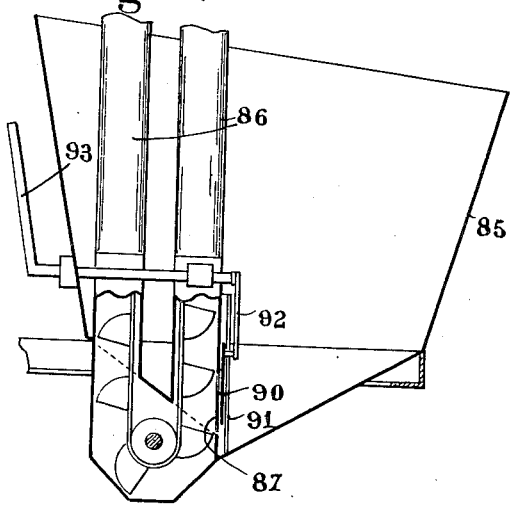
FIGURE 10 is an elevational view showing on a larger scale, with parts broken away, a loading hopper with an elevator feeding the discharge hopper.
Figure 11:
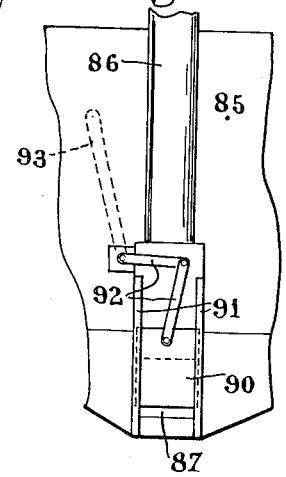
FIGURE 11 is a corresponding transverse view.

The pneumatic apparatus comprises a housing 66 mounted at the top of the machine and designated to form a suction shaft 67 in close proximity of the region where the products are distributed by the hopper 61, a first expansion chamber 68 the bottom of which receives by gravity the grains and impurities having a certain density, another expansion compartment 69 in which the middle-weight products are deposited, and finally a compartment 70 in which the centrifugal fan 71 is mounted for discharging through an outlet passage 72 the low-density particles and dusts. The bottoms of both compartments 68 and 69 are each provided with a trap-valve 73 hingedly mounted about a horizontal axis 74 and adapted to be opened by gravity when a sufficient quantity of products has accumulated in these compartments, this trap-valve being re-closed automatically after the discharge of these products, due to the vacuum produced in the compartments. To permit the adjustment of this vacuum, the bottom of the second compartment 69 is provided above the space containing the screening cylinder and in the vicinity of the fan housing 70 with at least one flap-valve or shutter 75 hingedly mounted about a fixed horizontal axis 76 and rotatably rigid with a tapped socket 77 engaging the externally-threaded inner end 78 of a control rod 79 externally of the machine. The non-threaded portion of this rod co-acts with a socket 80 from which emerges a lateral pin 81 slidably engaged in a slot 82 formed obliquely in a suitable protection plate 83. The non-threaded end of rod 79 carries a control handle 84. A rotary torque impressed to the handle 84 produces a longitudinal displacement of the rod 79 since the threaded portion thereof is screwed or unscrewed in the fixed socket 77. However, this movement of translation of the rod 79 is counteracted by the pin-and-slot device 81, 82 and therefore transformed into a pivotal movement of the rod 79 about the fulcrum 76 from a maximum opening position to a closed position. These end positions depending on the dimensions and inclination of the slot 82 are shown in the form of chain-dotted lines in FIG. 6.

As shown in FIGS. 7 to 11 of the drawings, the machine according to this invention comprises at its lower portion a relatively large loading hopper 85 adapted to receive the products to be cleaned and graded which are delivered for example from a harvester-thresher machine. In order to facilitate the discharge, this hopper is preferably secured to the lower portion of the machine. A bucket elevator 86 feeds the distributor hopper 61 with products from the discharge hopper 85. To this end, the lower portion of this bucket elevator which is lowered into the bottom portion of the hopper 85 is formed with an aperture 87 through which the products may penetrate into the zone where the buckets 89 are loaded. The supply of products to the distributor or feed hopper 61 may be adjusted by associating a sliding door 90 with the aperture 87, this door sliding in vertical slideways 91 mounted externally of the lower portion of the elevator. A linkage system 92 controlled by means of a handle 93 arranged externally of the machine enables the operator to set the door 90 at will in order to adjust the output of products to be poured into the distributor hopper.

Another elevator 94 preferablby of the Archimedean-screw type is mounted on the machine for taking the good products screened by the rotary screen 110 and depositing or sacking them on the platform of a truck (not shown); the lower portion of this elevator 94 is provided with a cavity 95 adapted to be brought to an operative position with respect to the draining apertures 96 of the compartments in which the graded grains are discharged from the screening cylinder 110. In order to reduce the over-all dimensions of the machine when the latter is not in operation, this elevator 94 may be retracted horizontally and to this end it is pivoted at a point 97 of the machine. This elevator 94 may be locked in its inoperative position for example by means of a pin 98 according to the known method.

To permit its operation under any circumstances the machine is equipped with an electrometer 99 and also with a thermal engine 100. According to the conditions of operation, the shafts driving the different parts of this machine may be coupled to the output shaft of one or the other power unit.

The machine of this invention may advantageously be mounted on wheels 101 to facilitate its displacements, and adjustable props 102 may also be provided to ensure its stability during its operation.

Although the present invention has been described in conjunction with preferred embodiments, it is to be understood that modifications and variations may be resorted to without departing from the spirit and scope of the invention, as those skilled in the art will already understand. Such modifications and variations are considered to be within the purview and scope of the invention and appended claims.

What I claim is:

1. A machine for cleaning and grading grains comprising a casing having a forward wall, said forward wall of said casing being formed with an aperture, a chute engaged in said aperture, of said forward wall of said casing, a funnel extending upwardly from said chute and having a forward wall, said forward wall of said funnel being formed with an aperture overlying said chute, a distributor hopper mounted in the forward wall of the funnel above the aperture of the forward wall, said distributor hopper being adapted to pour by gravity into the funnel and toward the chute a continuous stream of grains to be treated, an expansion chamber overlying the casing and communicating with the funnel, a housing mounted in the expansion chamber and communicating with said chamber and with the outside of the machine, a suction fan mounted in said housing and adapted for continuous rotation, said suction fan being effective to draw into the expansion chamber air from the aperture of the forward wall of the funnel, which air is loaded with impurities carried along by said air during its travel through the stream of grains to be treated which is discharged by the chute into the funnel, and being effective to discharge said air loaded with impurities to the outside of the machine, adjustable means for varying the direction of the air stream to the expansion chamber which is drawn through the aperture of the forward wall of the funnel, means for discharging from the expansion chamber those impurities that are not carried into the housing and settle in said chamber, means for adjusting the output of air drawn by the fan through the funnel, a shaft mounted in the casing with a slight inclination fore-and-aft of the machine and adapted to be in continuous rotation, a screening cylinder rigid with said shaft, the chute engaged in the aperture of the forward wall of the casing entering said screening cylinder and being positioned to discharge the cleaned grains into said screening cylinder, said screening cylinder comprising successive sections with graduated size perforations, the size of said perforations increasing along the casing from the forward wall of said casing, walls mounted in the casing below the screening cylinder and defining successive compartments, including a first compartment to collect the extraneous particles of a size less than the smallest grains to be removed, a series of intermediate compartments to receive graded grains of corresponding size groups, and a last compartment located after the last section of the screening cylinder to collect the extraneous particles of a greater size than the largest grains to be removed, and draining means in the casing to remove the extraneous particles from the first and the last compartments and to recover the graded grains of the various size groups from the intermediate compartments.

2. A machine for cleaning and grading grains as set forth in claim 1, further comprising spreader and shovelling blades rigidly carried interiorly of the screening cylinder.

3. A machine for cleaning and grading grains comprising a casing having a forward wall, said forward wall of said casing being formed with an aperture, a chute engaged in said aperture of said forward wall of said casing, a funnel extending upwardly from said chute and casing, having a forward wall, said forward wall of said funnel being formed with an aperture overlying said chute, a distributor hopper mounted in the forward wall of the funnel above the aperture of the forward wall, said distributor hopper being adapted to pour by gravity into the funnel and toward the chute a continuous stream of grains to be treated, an expansion chamber overlying the casing and communicating with the funnel, a housing mounted in the expansion chamber and communicating with said chamber and with the outside of the machine, a suction fan mounted in said housing and adapted for continuous rotation, said suction fan being effective to draw the expansion chamber air from the aperture of the forward wall of the funnel, which air is loaded with impurities carried along by said air during its travel through the stream of grains to be treated which is discharged by the chute into the funnel, and being effective to discharge said air loaded with impurities to the outside of the machine, a pivot pin mounted in said funnel in front of said aperture, a pair of parallel slideways pivotally mounted about said pin, bearings carried by said slideways, a pair of shafts rotatably mounted in said bearings and parallel to said slideways, said two shafts having threaded end portions, a baffle plate having two trunnions engaged in said slideways and an end carrying a link, a nut carried by said trunnions and screwed onto the threaded end of one of said two shafts, a second nut carried by said link and screwed onto the threaded end of the other shaft, and a pair of actuating crank-handles secured on said two shafts respectively and adapted, in cooperation with the pivoting movements of said slideways about said pivot pin, to position said baffle plate in said vertical passage in any desired position and direction for properly directing the air stream drawn through said aperture in said vertical passage, means for discharging from the expansion chamber those impurities that are not carried into the housing and settle in said chamber, means for adjusting the output of air drawn by the fan through the funnel, a shaft mounted in the casing with a slight inclination fore-and-aft of the machine and adapted to be in continuous rotation, a screening cylinder rigid with said shaft, the chute engaged in the aperture of the forward wall of the casing entering said screening cylinder and being positioned to discharge the cleaned grains into said screening cylinder, said screening cylinder comprising successive sections with graduated size perforations, the size of said perforations increasing along the casing from the forward wall of said casing, walls mounted in the casing below the screening cylinder and defining successive compartments, including a first compartment to collect the extraneous particles of a size less than the smallest grains to be removed, a series of intermediate compartments to receive graded grains of corresponding size groups, and a last compartment located after the last section of the screening cylinder to collect the extraneous particles of a greater size than the largest grains to be removed, and draining means in the casing to remove the extraneous particles from the first and the last compartments and to recover the graded grains of the various size groups from the intermediate compartments.

4. A machine for cleaning and grading grains comprising a casing having a forward wall, said forward wall of said casing being formed with an aperture, a chute engaged in said aperture of said forward wall of said casing, a funnel extending upwardly from said chute and having a forward wall, said forward wall of said funnel being formed with an aperture overlying said chute, a distributor hopper mounted in the forward wall of the funnel above the aperture of the forward wall, said distributor hopper being adapted to pour by gravity into the funnel and toward the chute a continuous stream of grains to be treated, an expansion chamber overlying the casing and communicating with the funnel, a housing mounted in the expansion chamber and communicating with said chamber and with the outside of the machine, a suction fan mounted in said housing and adapted for continuous rotation, said suction fan being effective to draw into the expansion chamber air from the aperture of the forward wall of the funnel, which air is loaded with impurities carried along by said air during its travel through the stream of grains to be treated which is discharged by the chute into the funnel, and being effective to discharge said air loaded with impurities to the outside of the machine, adjustable means for varying the direction of the air stream to the expansion chamber which is drawn through the aperture of the forward wall of the funnel, the expansion chamber having an inclined forwardly descending bottom formed at its lower forward end with an aperture, parallel blades pivotably mounted across said aperture, said parallel blades closing said aperture by the action of the vacuum produced in said expansion chamber and opening said aperture by the action of the weight of the impurities that are not carried into the housing and settle in said chamber, thus being effective to discharge said impurities, means for adjusting the output of air drawn by the fan through the funnel, a shaft mounted in the casing with a slight inclination fore-and-aft of the machine and adapted to be in continuous rotation, a screening cylinder rigid with said shaft, the chute engaged in the aperture of the forward wall of the casing entering said screening cylinder and positioned to discharge the cleaned grains into said screening cylinder, said screening cylinder comprising successive sections with graduated size perforations, the size of said perforations increasing along the casing from the forward wall of said casing, walls mounted in the casing below the screening cylinder and defining successive compartments, including a first compartment to collect the extraneous particles of a size less than the smallest grains and to be removed, a series of intermediate compartments to receive graded grains of corresponding size groups, and a last compartment located after the last section of the screening cylinder to collect the extraneous particles of a greater size than the largest grains to be removed, and draining means in the casing to remove the extraneous particles from the first and the last compartments and to recover the graded grains of the various size groups from the intermediate compartments.

5. A machine for cleaning and grading grains comprising a casing having a forward wall, said forward wall of said casing being formed with an aperture, a chute engaged in said aperture of said forward wall of said casing, a funnel extending upwardly from said chute and having a forward wall, said forward wall of said funnel being formed with an aperture overlying said chute, a distributor hopper mounted in the forward wall of the funnel above the aperture of the forward wall, said distributor hopper being adapted to pour by gravity into the funnel and toward the chute a continuous stream of grains to be treated, an expansion chamber overlying the casing and communicating with the funnel, a housing mounted in the expansion chamber and having a pair of lateral circular coaxial apertures communicating with said chamber and having a rearwardly-directed outlet communicating with the exterior of the machine, a suction-fan mounted in said housing and having a shaft coaxial to said pair of lateral apertures, said fan being adapted to be driven for continuous rotation and to draw through said circular lateral apertures of said housing air coming from the aperture of the forward wall of the funnel, which air is loaded with impurities carried along by said air during its travel through the stream of grains to be treated which is discharged by the chute into the funnel, and to discharge said air loaded with impurities to the outside of the machine, adjustable means for varying the direction of the air stream to the expansion chamber which is drawn through the aperture of the forward wall of the funnel, means for discharging from the expansion chamber those impurities that are not carried into the housing and settle in said chamber, said chamber having a bottom formed on both sides of the housing with apertures communicating with the casing, sliding gates mounted in said apertures, means to adjust the degree of opening of said sliding gates and thereby to adjust the air output drawn by said fan from said casing through said apertures and consequently the complementary output drawn by the fan through the aperture of the forward wall of the funnel, a shaft mounted in the casing with a slight inclination fore-and-aft of the machine and adapted to be in continuous rotation, a screening cylinder rigid with said shaft, the chute engaged in the aperture of the forward wall of the casing entering said screening cylinder and positioned to discharge the cleaned grains into said screening cylinder, said screening cylinder comprising successive sections with graduated size perforations, the size of said perforations increasing along the casing from the forward wall of said casing, walls mounted in the casing below the screening cylinder and defining successive compartments, including a first compartment to collect the extraneous particles of a size less than the smallest grains to be removed, a series of intermediate compartments to receive graded grains of corresponding size groups, and a last compartment located after the last section of the screening cylinder to collect the extraneous particles of a greater size than the largest grains to be removed, and draining means in the casing to remove the extraneous particles from the first and the last compartments and to recover the graded grains of the various size groups from the intermediate compartments.

6. A machine for cleaning and grading grains as set forth in claim 5, wherein said means for adjusting the degree of opening of said sliding gates comprise a tapped socket rigid with said other flap-valve, a pair of pivotally mounted trunnions carried by said socket, a control bar having a handle emerging from the machine for controlling the rotation of said control bar and a threaded end screwed in said tapped socket, another socket slidably engaged on said rod, a plate rigid with the bottom of said chamber and formed with a slot, and a pin extending radially from said other socket and slidably engaged in said slot.

7. A machine for cleaning and grading grains as set forth in claim 5, wherein means are provided for regulating the output of said distributor hopper in order automatically to adapt the cross-sectional area of the distributor aperture of said hopper to the weight of grains actually contained in said hopper.

8. A machine for cleaning and grading grains as set forth in claim 5, comprising a loading hopper disposed at its lower portion and adapted to receive the grains to be treated in the machine, and an elevator for distributing the grains to be treated, said elevator drawing grains from said loading hopper and pouring same into said distributor hopper, and means for adjusting the output of the thus poured grains into said distributor hopper.

9. A machine for cleaning grains as set forth in claim 5, which comprises a cavity fed with cleaned and graded grains through means mounted within said closed space under said screening cylinder for collecting said cleaned and graded grains falling from said screening cylinder, and a discharge elevator for the graded grains, said discharge elevator having a lower portion drawing grains from said cavity and an upper portion for unloading this grain.

10. A machine as set forth in claim 8, which comprises means for pivotally mounting said elevator for the graded grains, and means for locking said elevator whereby said elevator may be secured in a vertical operating position and in a retracted horizontal position.

References Cited in the file of this patent

UNITED STATES PATENTS 209,165    Fender _____ Oct. 22, 1878

FOREIGN PATENTS

C10130    Germany _____ Nov. 3, 1955